US009780958B2

(12) United States Patent
Lu et al.

(10) Patent No.: US 9,780,958 B2
(45) Date of Patent: *Oct. 3, 2017

(54) MULTI-CELL COORDINATION FOR MULTIMEDIA BROADCAST MULTICAST SERVICES IN A WIRELESS COMMUNICATION SYSTEM

(71) Applicant: INTERDIGITAL TECHNOLOGY CORPORATION, Wilmington, DE (US)

(72) Inventors: Guang Lu, Thornhill (CA); Arty Chandra, Manhasset Hills, NY (US); Guodong Zhang, Syosset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 210 days.

This patent is subject to a terminal disclaimer.

(21) Appl. No.: 14/465,010

(22) Filed: Aug. 21, 2014

(65) Prior Publication Data

US 2014/0362759 A1   Dec. 11, 2014

Related U.S. Application Data

(63) Continuation of application No. 11/835,507, filed on Aug. 8, 2007, now Pat. No. 8,843,118.

(Continued)

(51) Int. Cl.
| | |
|---|---|
| *H04W 74/00* | (2009.01) |
| *H04L 12/18* | (2006.01) |

(Continued)

(52) U.S. Cl.
CPC ........ *H04L 12/1881* (2013.01); *H04L 5/0064* (2013.01); *H04L 65/103* (2013.01); *H04W 72/005* (2013.01); *H04W 88/16* (2013.01)

(58) Field of Classification Search
CPC .............................. H04W 56/00; H04W 24/02
(Continued)

(56) References Cited

U.S. PATENT DOCUMENTS 6,968,190 B1   11/2005  Suumaki et al.
7,180,885 B2    2/2007  Terry et al.
(Continued)

FOREIGN PATENT DOCUMENTS

| EP | 1372350 | 12/2003 |
|---|---|---|
| JP | 2002-335556 | 11/2002 |

(Continued)

OTHER PUBLICATIONS

"3rd Generation Partnership Project; Technical Specification Group Radio Access Network; Feasibility Study for evolved Universal Terrestrial Radio Access (UTRA) and Universal Terrestrial Radio Access Network (UTRAN) (Release 7)", 3GPP TR 25.912 V7.0.0, Jun. 2006, 57 pages.

(Continued)

*Primary Examiner* — Kiet Doan
(74) *Attorney, Agent, or Firm* — Eric Berkowitz (57) ABSTRACT

The present invention is related to a method and system for multi-cell coordination for multimedia broadcast multicast services (MBMS) in a wireless communication system. An MBMS multi-cell coordination unit is provided to coordinate a plurality of evolved Node-Bs (eNodeBs) for transmission of MBMS data synchronously in multiple cells of the same single frequency network (SFN). The MBMS multi-cell coordination unit may be located in an access gateway or in an eNodeB. An MBMS multi-cell scheduling scheme may be preconfigured for the eNodeBs for synchronization. Alternatively, the eNodeBs may be synchronized dynamically.

12 Claims, 3 Drawing Sheets

Related U.S. Application Data (60) Provisional application No. 60/839,196, filed on Aug. 21, 2006.

(51) Int. Cl.
  *H04W 72/00* (2009.01)
  *H04L 5/00* (2006.01)
  *H04L 29/06* (2006.01)
  *H04W 88/16* (2009.01)

(58) Field of Classification Search
  USPC ........ 370/312, 329, 241, 311; 455/446, 525, 455/509
  See application file for complete search history.

(56) References Cited

U.S. PATENT DOCUMENTS

| | | |
|---|---|---|
| 7,283,815 B2 | 10/2007 | Kim et al. |
| 7,450,545 B2 | 11/2008 | Kim et al. |
| 7,570,916 B2 | 8/2009 | Xiao et al. |
| 7,646,762 B2 | 1/2010 | Cai et al. |
| 7,969,932 B2 | 6/2011 | Fischer |
| 7,996,033 B2 | 8/2011 | Yoshida et al. |
| 8,059,572 B2 | 11/2011 | Kim et al. |
| 8,521,139 B2 | 8/2013 | Vayanos et al. |
| 2002/0089998 A1 | 7/2002 | Le |
| 2002/0207696 | 11/2003 | Willenegger et al. |
| 2003/0224794 A1 | 12/2003 | Kim et al. |
| 2004/0008646 A1 | 1/2004 | Park et al. |
| 2004/0017809 A1 | 1/2004 | Park |
| 2004/0116125 A1 | 6/2004 | Terry |
| 2004/0151133 A1 | 8/2004 | Yi et al. |
| 2005/0042987 A1 | 2/2005 | Lee et al. |
| 2005/0094618 A1 | 5/2005 | Colban et al. |
| 2005/0152392 A1 | 7/2005 | Lim et al. |
| 2005/0175070 A1 | 8/2005 | Grob et al. |
| 2005/0201407 A1 | 9/2005 | Kim et al. |
| 2005/0249188 A1 | 11/2005 | Hayashi |
| 2006/0088023 A1 | 4/2006 | Muller |
| 2006/0106865 A1 | 5/2006 | Beming et al. |
| 2006/0146745 A1* | 7/2006 | Cai .................. H04L 12/1881 370/328 |
| 2006/0159031 A1 | 7/2006 | Vialen et al. |
| 2006/0176838 A1 | 8/2006 | Lee et al. |
| 2007/0133449 A1 | 6/2007 | Schacht et al. |
| 2007/0155390 A1 | 7/2007 | Kodikara Patabandi et al. |
| 2007/0218928 A1 | 9/2007 | Kuo |
| 2007/0258358 A1* | 11/2007 | Cho .................. H04L 27/2607 370/208 |
| 2007/0280177 A1* | 12/2007 | Uusikartano .......... H04W 8/12 370/338 |
| 2007/0291674 A1 | 12/2007 | Cheng et al. |
| 2008/0043658 A1 | 2/2008 | Worrall et al. |
| 2008/0045228 A1 | 2/2008 | Zhang et al. |
| 2008/0165717 A1 | 7/2008 | Chen et al. |
| 2008/0181161 A1 | 7/2008 | Gi Kim |
| 2008/0267109 A1 | 10/2008 | Wang et al. |
| 2008/0273482 A1 | 11/2008 | Lee et al. |
| 2008/0316952 A1 | 12/2008 | Gruber et al. |
| 2009/0175212 A1 | 7/2009 | Rey et al. |
| 2009/0213775 A1 | 8/2009 | Rey et al. |
| 2009/0303910 A1 | 12/2009 | Sun et al. |
| 2010/0172281 A1 | 7/2010 | Hus et al. |
| 2011/0044225 A1 | 2/2011 | Rinne et al. |
| 2012/0224523 A1 | 9/2012 | Reznik et al. |

FOREIGN PATENT DOCUMENTS

| | | |
|---|---|---|
| JP | 2003-348643 | 12/2003 |
| JP | 2006-013826 | 1/2006 |
| JP | 2006-074815 | 3/2006 |
| JP | 2007-529948 | 10/2007 |
| KR | 2003-0096090 | 12/2003 |
| WO | WO-2005/088904 | 9/2005 |
| WO | WO-2006/025654 | 3/2006 |
| WO | WO-2007/148187 | 12/2007 |
| WO | WO-2007/149349 | 12/2007 |

OTHER PUBLICATIONS

"3rd Generation Partnership Project; Technical Specification Group Radio Access Network; Feasibility study for evolved Universal Terrestrial Radio Access (UTRA) and Universal Terrestrial Radio Access Network (UTRAN) (Release 7)", 3GPP TR 25.912 V7.2.0, Jun. 2007, 64 pages.

"3rd Generation Partnership Project; Technical Specification Group Radio Access Network; Synchronisation in UTRAN Stage 2 (Release 7)", 3GPP TS 25.402 V7.3.0, Jun. 2007, 36 pages.

"3rd Generation Partnership Project; Technical Specification Group Radio Access Network; Synchronisation in UTRAN Stage 2 (Release 7)", 3GPP TS 25.402 V7.0.0, Mar. 2006, 48 pages.

"Canadian Office Action", Canadian Application No. 2,661,314, Nov. 1, 2013, 2 pages.

"EP Communication—EP extended search report", EP Application No. 13161232.7, May 6, 2013, 10 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.1.0, Jun. 2007, 106 pages.

"Japanese Notice of Rejection", Japanese Application No. 2013-203807, Feb. 10, 2015, 4 pages.

"Japanese Notice of Rejection (English Translation)", Japanese Application No. 2013-203807, Feb. 10, 2015, 5 pages.

"Japanese Official Notice of Rejection", Japanese Patent Application No. 2013-203807, May 7, 2014, 4 pages.

"Japanese Official Notice of Rejection", Japanese Patent Application No. 2009-525557, Oct. 4, 2011, 4 pages.

"Japanese Official Notice of Rejection (Translation)", Japanese Patent Application No. 2009-525557, Oct. 4, 2011, 4 pages.

"Japanese Official of Rejection (English Translation)", Japanese Patent Application No. 2013-203807, May 7, 2014, 4 pages.

"Korean Office Action", Korean Application No. 2009-7005809, Dec. 1, 2010, 4 pages.

"Korean Office Action (English Translation)", Korean Application No. 2009-7005809, Dec. 1, 2010, 3 pages.

Alcatel Shanghai Bell, "L2 content transmission synchronization for MBMS in LTE SFN", 3GPP Tdoc R3-061008, 3GPP TSG-RAN WG RAN3 #53, Tallinn, Estonia, Aug. 28-Sep. 1, 2006, 4 pages.

Chapman, Thomas, "LS on SFN operation for E-MBMS", 3GPP Tdoc R3-060866, 3GPP TSG-RAN1 Meeting #52, Shanghai, China, May 8-12, 2006, 1 page.

Alcatel Shanghai Bell, "Synchronization requirements for MBMS RF combining in LTE SFN", 3GPP Tdoc R3-061007, 3GPP TSG-RAN WG RAN3 #53, Tallinn, Estonia, Aug. 28-Sep. 1, 2006, 3 pages.

"Taiwanese Office Action", Taiwanese Application No. 102146475, Mar. 30, 2015, 12 pages.

"Taiwanese Office Action", Taiwan Application No. 096129898, Oct. 7, 2013, 6 Pages.

"Taiwanese Office Action (English Translation)", Taiwan Application No. 096129898, Oct. 7, 2013, 5 Pages.

"Taiwanese Office Action (English Translation)", Taiwanese Application No. 102146475, Mar. 30, 2015, 7 pages.

Ericsson, "Time Synchronization between BM-SCs and MBMS Ues", 3GPP Tdoc S4-050719, Change Request 26.346 V6.2.0, 3GPP TSG-RAN SA4 Meeting #36, Bordeaux, France, Nov. 13-18, 2005, 7 pages.

Motorola, "Centralized Function for LTE MBMS", 3GPP Tdoc R2-061350, 3GPP TSG-RAN-WG2 Meeting #53, Shanghai, China, May 8-12, 2006, 4 pages.

NTT Docomo, "MBMS Functional Allocation for SAE/LTE", 3GPP Tdoc R3-060416, 3GPP TSG-RAN3 #51bis, Apr. 3-5, 2006, 4 pages.

(56) References Cited

OTHER PUBLICATIONS

Siemens, "LTE MBMS", 3GPP Tdoc R2-060931, 3GPP TSG RAN WG RAN2 Meeting #52; Athens, Greece, Mar. 27-31, 2006, 4 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", 3GPP TR 25.813 V7.0.0, Jun. 2006, 39 pages.

"3rd Generation Partnership Project; Technical Specification Group Radio Access Network; Introduction of the Multimedia Broadcast Multicast Service (MBMS) in the Radio Access Network (RAN); Stage 2 (Release 6)", 3GPP TS 25.346 V6.8.0, Jun. 2016, 59 pages.

"3rd Generation Partnership Project; Technical Specification Group Radio Access Network; Radio Resource Control (RRC); Protocol Specification (Release 6)", 3GPP TS 25.331 V6.9.0, Mar. 2006, 1,209 pages.

"3rd Generation Partnership Project; Technical Specification Group Services and System Aspects; Multimedia Broadcast/Multicast Service (MBMS) user services; Stage 1 (Release 6)", 3GPP TS 22.246 V6.3.0, Mar. 2006, 16 pages.

"3rd Generation Partnership Project; Technical Specification Group Services and System Aspects; Multimedia Broadcast/Multicast Service (MBMS); Architecture and functional description (Release 6)", 3GPP TR 23.846 V6.1.0, Dec. 2002, 114 pages.

"3rd Generation Partnership Project; Technical Specification Group Services and System Aspects; Multimedia Broadcast/Multicast Service (MBMS); Architecture and functional description (Release 6)", 3GPP TS 23.246 V6.9.0, Dec. 2005, 47 pages.

"3rd Generation Partnership Project; Technical Specification Group Services and System Aspects; Multimedia Broadcast/Multicast Service; Stage 1 (Release 6)", 3GPP TS 22.146 V6.7.0, Mar. 2006, 17 pages.

Huawei, "Consideration on Co-ordinating Function", 3GPP Tdoc R2-061886, 3GPP TSG RAN2 ad-hoc on LTE, Cannes, France, Jun. 27-30, 2006, 5 pages.

Lucent Technologies, "Data synchronisation for LTE E-MBMS Services", 3GPP Tdoc R2-061944, 3GPP TSG-RAN WG2 LTE Ad Hoc, Cannes, France, Jun. 27-30, 2006, 3 pages.

\* cited by examiner

MULTI-CELL COORDINATION FOR MULTIMEDIA BROADCAST MULTICAST SERVICES IN A WIRELESS COMMUNICATION SYSTEM

CROSS REFERENCE TO RELATED APPLICATIONS

This application is a continuation of U.S. application Ser. No. 11/835,507, filed Aug. 8, 2007, which claims the benefit of U.S. Provisional Application No. 60/839,196, filed Aug. 21, 2006, the contents of which are incorporated by reference herein.

FIELD OF INVENTION

The present invention is related to a wireless communication system. More particularly, the present invention is related to multi-cell coordination for multimedia broadcast multicast services (MBMS) in a wireless communication system.

BACKGROUND

The third generation partnership project (3GPP) Release 6 defines MBMS, which is a counterpart of other multicast services operating in other communication standards, such as digital video broadcast-handheld (DVB-H). MBMS allows downlink data to be transmitted from a single source to multiple recipients in broadcast or multicast modes. The existing 3GPP release also defines the MBMS channels, scheduling, bearers, procedures, and the like.

In the 3GPP long term evolution (LTE) project, a new universal mobile telecommunication system (UMTS) evolved universal terrestrial radio access network (E-UTRAN) and evolved core network are introduced. This inevitably requires changes to the current specifications for MBMS so that the new architecture can support MBMS efficiently.

LTE requires the support of single cell and multi-cell MBMS transmissions. For multi-cell transmission, MBMS, (e.g., mobile TV), is transmitted on the coverage of a group of cells, MBMS may be transmitted on a multicast channel (MCH), soft combining of MBMS data at the receiver may be supported within a particular service group (i.e., single frequency network (SFN)), and synchronous transmission of MBMS data from multiple cells is possible.

To achieve synchronous data transmission in multiple cells in the LTE architecture, inter-cell scheduling is required. In Release 6, the synchronization is performed by a radio network controller (RNC). However, without an RNC in the new LTE architecture, alternative procedures have to be provided to facilitate multi-cell transmission.

SUMMARY

The present invention is related to a method and system for multi-cell coordination for MBMS in a wireless communication system. An MBMS coordination unit is provided to coordinate a plurality of evolved Node-Bs (eNodeBs), (i.e., cells), for transmission of MBMS data synchronously in multiple cells. The MBMS coordination unit may be located in an access gateway or in an eNodeB. An MBMS multi-cell scheduling scheme may be preconfigured for the eNodeBs for synchronization. Alternatively, the eNodeBs may be synchronized dynamically.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to an eNodeB, a site controller, an access point (AP), or any other type of interfacing device capable of operating in a wireless environment.

The present invention addresses issues to support multi-cell transmission of MBMS in the proposed LTE architecture. The present invention defines a multi-cell coordination unit, proposes the location of the MBMS coordination unit and different scheduling procedures, defines how the existing MBMS functionalities, (such as notification and counting), may be modified in the new architecture, and defines the new scheduling for the MBMS control channel.

Figure 1:
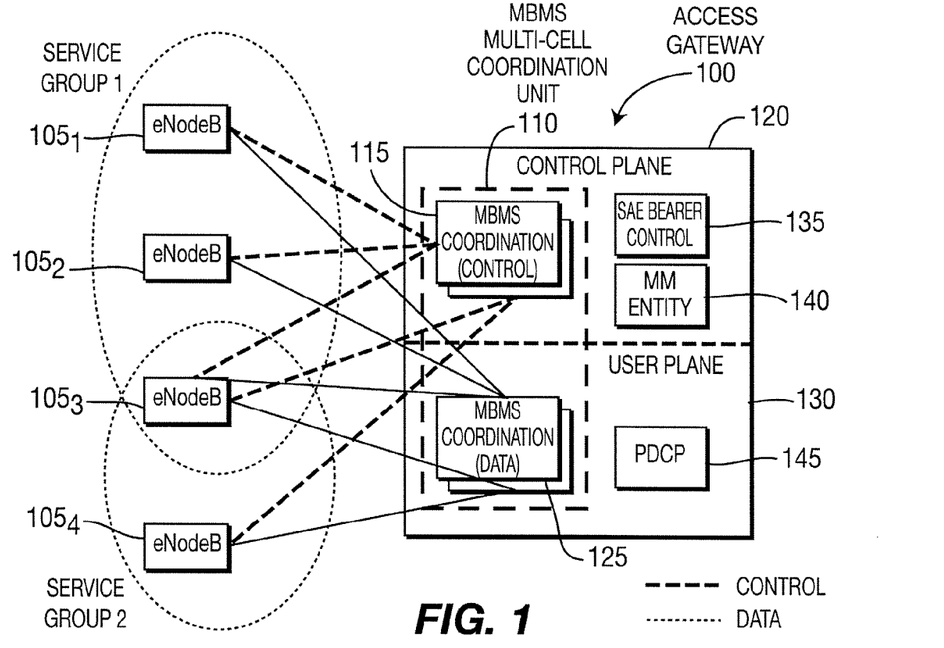
FIG. 1 shows an MBMS coordination unit located in an access gateway in accordance with the present invention.

FIG. 1 shows an access gateway 100 in communication with a plurality of eNodeBs, (i.e., cells) $105_1$, $105_2$, $105_3$ and $105_4$. The access gateway 100 includes an MBMS multi-cell coordination unit 110, (i.e., an MBMS server), configured in accordance with the present invention. The MBMS multi-cell coordination unit 110 is a logical entity that controls the eNodeBs 105 and coordinates multi-cell scheduling and transmission when the eNodeBs 105 belong to the same cell group. Functions of MBMS coordination unit 110 may include scheduling and timing control, counting, eNodeB registration and feedback. For each SFN, the MBMS multi-cell coordination unit 110 also configures the common scrambling code of each eNodeB 105 in the SFN. For different MBMS, the SFN may be different (consisting of different cells/eNodeBs).

Still referring to FIG. 1, the MBMS multi-cell coordination unit 110 includes at least one control part 115 located in a control plane 120 of the access gateway 100 for coordinating control signaling, and at least one data part 125 located in a user plane 130 of the access gateway 100 for coordinating data signaling. Both the control part 115 and the data part 125 may have multiple instances, each of which corresponds to a particular service group, (i.e., SFN). The access gateway 100 further includes a system architecture evolution (SAE) bearer control unit 135, a mobility management entity (MME) 140 and a packet data convergence protocol (PDCP) unit 145.

The SAE bearer control unit 135 is the LTE counterpart of the old "radio access bearer control" or "RAB control" in wideband code division multiple access (WCDMA). It controls the configuration of the radio access bearers. The MME unit 140 hosts the following functionalities: distribution of paging messages to the eNodeBs, security control, idle state mobility control, and ciphering and integrity protection of non-access stratum (NAS) signaling. The main services and functions of the PDCP unit 145 include header compression and decompression, transfer of user data, (i.e., the PDCP receives a PDCP service data unit (SDU) from the NAS and forwards it to the radio link control (RLC) layer and vice versa, reordering of the downlink RLC SDUs at least during inter-eNodeB mobility, in-sequence delivery of upper layer protocol data units (PDUs) at handover (HO) in the uplink (for further study (FFS)), duplicate detection of lower layer SDUs, and ciphering of user plane data and control plane data (NAS signaling).

The MBMS multi-cell coordination unit 110 may be located between the E-UTRAN, (i.e., an eNodeB), and the access gateway 100. The physical location of the MBMS multi-cell coordination unit 110 depends on the particular implementation. As described above, FIG. 1 shows an MBMS multi-cell coordination unit 110 that is co-located with an access gateway 100. In this scenario, there are multiple instances in the control plane 120 of the access gateway 100 for the control signaling, and multiple instances in the user plane 130 of the access gateway 100 for the data traffic.

When there are mixed MBMS between the LTE and the current UMTS system, an inter-access MBMS coordination unit needs to be located at the inter-access anchor node. The inter-access MBMS coordination unit interacts with the MBMS multi-cell coordination unit 110 at the access gateway 100 for LTE and MBMS functions in the RNC for UMTS.

Figure 2:
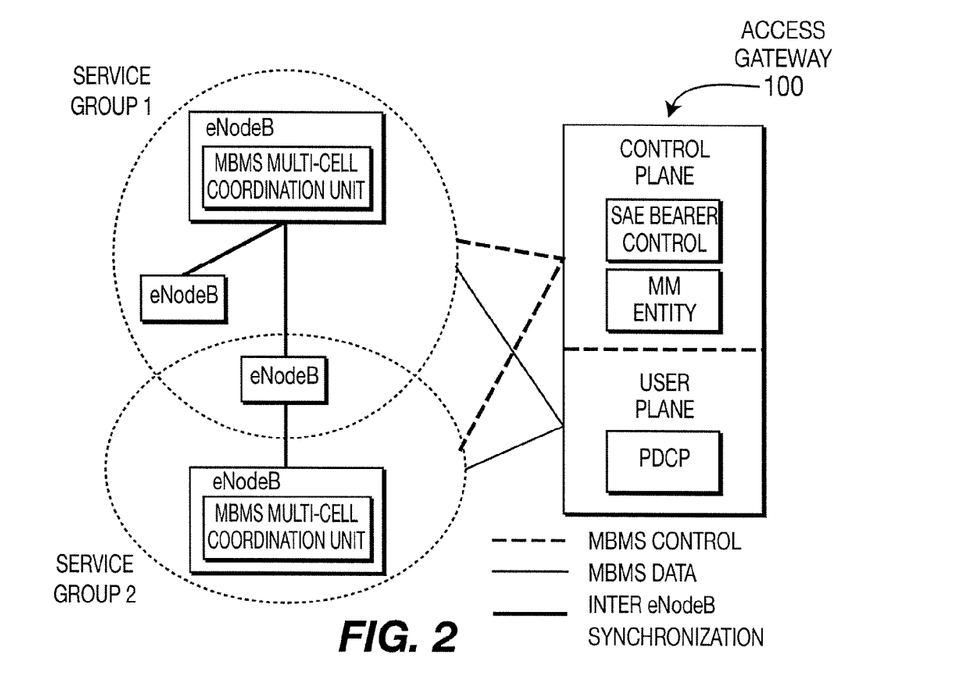
FIG. 2 shows an MBMS coordination unit located in an eNodeB in accordance with the present invention.

In an alternate embodiment, the MBMS multi-cell coordination unit 110 may be located in an eNodeB, as shown in FIG. 2. This solution may have some potential issues, such as how to determine which eNodeB(s) will be a "master" eNodeB that contains an MBMS multi-cell coordination unit 110. The "master" eNodeB may be determined statically by pre-configuration or dynamically, so the "master" eNodeB may change for different services. Furthermore, extra "handshaking" signalings among the eNodeBs are required.

When MBMS data arrives at the access gateway 100, it is scheduled such that it is transmitted synchronously to all of the eNodeBs 105 in a particular cell group. In accordance with the present invention, the eNodeBs 105 execute the actual scheduling, while the MBMS multi-cell coordination unit 110 insures that the transmission is synchronized among the eNodeBs. It is assumed that the eNodeBs are synchronized in terms of time.

Figure 3:
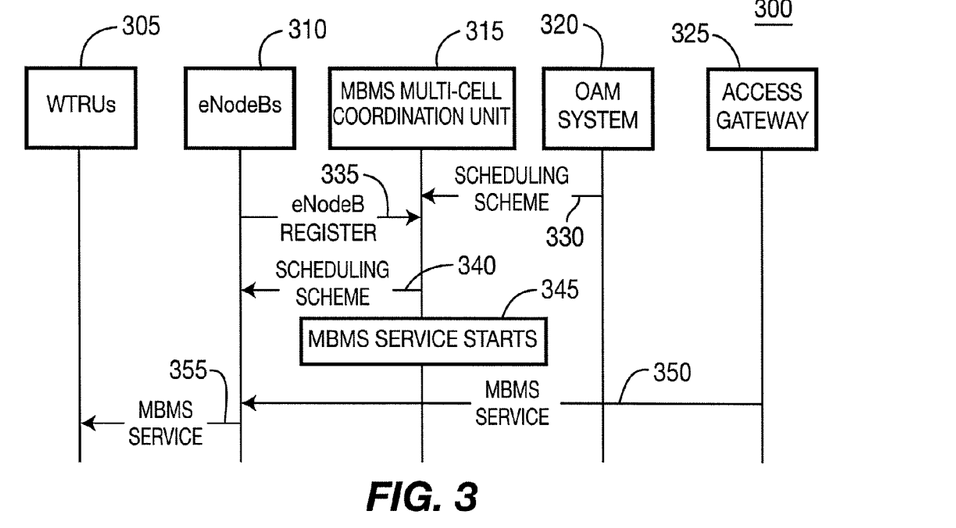
FIG. 3 is a signal flow diagram for pre-configuring scheduling to synchronize a group of eNodeBs in accordance with one embodiment of the present invention.

FIG. 3 shows a signal flow diagram for implementing a pre-configuring scheduling procedure 300 for synchronizing a group of eNodeBs in a wireless communication system including a plurality of WTRUs 305, a plurality of eNodeBs 310, an MBMS multi-cell coordination unit 315, an operations, administration and maintenance (OAM) system 320 and an access gateway 325 in accordance with one embodiment of the present invention. In step 330, the MBMS multi-cell coordination unit 315 obtains MBMS multi-cell scheduling criteria before the MBMS begin, such as from the OAM system 320. The criteria can be, for example, the eNodeBs transmitting MBMS data at a predetermined amount of time after notification of MBMS data. Alternatively, the scheme can be for the eNodeBs to transmit MBMS data at a predetermined amount of time after MBMS data first arrives at the eNodeBs 310. Each scheme is set by the signalings, and triggered by the transmission criteria, such as the arrival of MBMS data.

Still referring to FIG. 3, the eNodeBs 310 register with the MBMS multi-cell coordination unit 315 before the MBMS begin (step 335). The registration can be part of the system start/restart procedure at the eNodeBs, whereby an eNodeB that wants to provide a particular MBMS service needs to be registered with the MBMS coordination unit 315 first. If there is no indication of resource reservation from the MBMS multi-cell coordination unit 315, the eNodeBs 310 inform the MBMS multi-cell coordination unit 315 of the availability of resources. The MBMS transmission time stamp and information on required resources for MBMS data will be passed to the eNodeBs 310. The scheme may be restarted or modified during the MBMS service.

Still referring to FIG. 3, after an eNodeB 310 is registered with the MBMS multi-cell coordination unit 315, the MBMS multi-cell coordination unit 315 will notify the eNodeB 310 regarding the details of a particular MBMS scheduling scheme (step 340). The MBMS scheduling scheme notification may include information including MBMS service type, data rate, start time, end time and the like. When MBMS service starts in step 345, the MBMS data arrives at the eNodeBs 310 from the access gateway 325 (step 350). Finally, in step 355, the eNodeBs 310 will transmit the MBMS data to the WTRUs 305 in accordance with the MBMS scheduling scheme notified in step 340.

Figure 4:
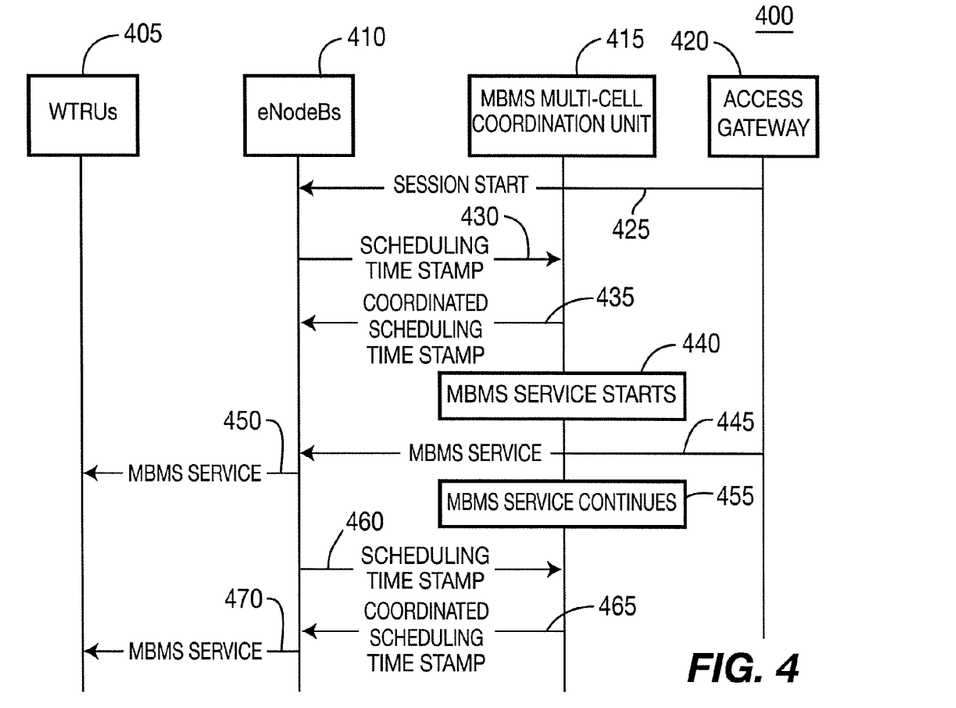
FIG. 4 is a signal flow diagram for hand-shaking scheduling to dynamically synchronize a group of eNodeBs in accordance with another embodiment of the present invention.

FIG. 4 is a signal flow diagram for implementing a hand-shaking scheduling procedure 400 for dynamically synchronizing a group of eNodeBs in a wireless communication system including a plurality of WTRUs 405, a plurality of eNodeBs 410, an MBMS multi-cell coordination unit 415, and an access gateway 420 in accordance with another embodiment of the present invention. Each of the eNodeBs 410 is controlled by the MBMS multi-cell coordination unit 415. In step 425, the access gateway 420, (or the MBMS multi-cell coordination unit 415), notifies the eNodeBs 410 that an MBMS session starts. In step 430, each eNodeB 410 sends an estimated time stamp and resource availability information to the MBMS multi-cell coordination unit 415. The time stamp suggests the time that each eNodeB 410 can start an MBMS transmission. Based on received information, the MBMS multi-cell coordination unit 415 determines a coordinated time when MBMS data should be transmitted to the WTRUs by all eNodeBs 410 in the same SFN. In step 435, the MBMS multi-cell coordination unit 415 informs the eNodeBs 410 about the time when the transmission of MBMS data to the WTRUs should start by sending a coordinated scheduling time stamp. Then, the MBMS service starts in step 440. In step 445, the eNodeBs 410 receive MBMS data from the access gateway 420. In step 450, the eNodeBs 410 provide MBMS by transmitting the MBMS data to the WTRUs 405 according to the coordinated scheduling time stamp sent by the MBMS multi-cell coordination unit 415. The hand-shaking signaling described above may need to be repeated, whereby in step 455, the MBMS continue, and steps 460, 465 and 470 are implemented in the same manner as corresponding steps 430, 435 and 450, respectively.

In accordance with another embodiment of the present invention, it is important that the MBMS multi-cell coordination unit 110 of FIG. 1 receives sufficient information from the eNodeBs 105 so that the MBMS multi-cell coordination unit 110 can schedule transmissions accordingly. The MBMS multi-cell coordination unit 110 may have, but is not limited to, the following information:

1) the eNodeB identification: the MBMS multi-cell coordination unit 110 may use it to check if the eNodeB 105 has registered for the service group or to get other preloaded information about the eNodeB 105, such as a previous counting record, and the like;
2) the eNodeB type: information such as if the eNodeB 105 controls mixed or dedicated cells for MBMS;
3) the number of users interested in the MBMS;
4) the eNodeB status for MBMS, (e.g., whether or not resources are allocated for MBMS); and
5) existing MBMS: when there are multiple MBMS in a cell.

The information is sent from the eNodeB 105 to the MBMS multi-cell coordination unit 110 via the control signaling between them.

The MBMS multi-cell coordination unit 110 also keeps track of the resources availability at any given time. If the resources are not used, the eNodeBs 105 are allowed to use it for dedicated service. However, the priority of the resources should be for MBMS.

In accordance with yet another embodiment of the present invention, the MBMS notification mechanism is used to inform WTRUs of an upcoming change in critical MBMS control channel (MCCH) information. An MBMS notification indicator is sent from the eNodeB to a plurality of WTRUs. However, the notification message may be created at the access gateway or the MBMS multi-cell coordination unit. With no MBMS indicator channel (MICH), the information is sent over the MCCH. The WTRUs should be informed if an RRC connection is required. WTRUs at idle or RRC connected mode receive an MBMS notification. Upon detecting the MBMS notification indication for a service group, those WTRUs interested in a service corresponding to this group start reading the MCCH at the beginning of the next modification period. When a feedback mechanism is used, the type of feedback information should be included, such as counting, channel quality, completion of service, and the like.

In Release 6, notification is an RRC operation performed by an RNC. In the LTE architecture, the notification function may be performed at an eNodeB. However, for eNodeBs that belong to the same service group and are in the same SFN, notification should be synchronized by the MBMS multi-cell coordination unit.

In accordance with yet anther embodiment of the present invention, an MBMS counting procedure is used by a WTRU to inform the E-UTRAN about the number of WTRUs that are interested in receiving MBMS. A request for counting is indicated in the notification, and achieved by requesting WTRUs belonging to the same MBMS service group to respond to the counting request. The exact number of WTRUs responding to the counting request is a radio resource management (RRM) issue.

WTRUs with different LTE states react as follows: A WTRU in an LTE_IDLE state requests an RRC connection establishment procedure. The WTRUs will remain RRC connected until they receive the MBMS. A WTRU in an LTE_ACTIVE state will just need to inform the E-UTRAN of its interest in the MBMS. Within the WTRU, the response of interest to the MBMS will "lock" any attempts to release the RRC connection or to change the WTRU state from LTE_ACTIVE to LTE_IDLE.

In Release 6, upon reception of the MBMS ACCESS INFORMATION, the WTRU draws a random number and decides if it will respond to the counting procedure. If the WTRU should not respond this time period, the WTRU continues to acquire the MBMS ACCESS INFORMATION and repeats the above process again.

The present invention provides a modification of the procedure. Upon receiving the counting indication, the LTE active WTRU always notifies the E-UTRAN its interest in the advertised MBMS. Thus, the E-UTRAN will know immediately how many WTRUs are interested in receiving MSMS, and this information can be passed to a core network and a broadcast multicast service center (BM-SC) as well. The WTRU may also notify the E-UTRAN about its current connection status.

Then, for the idle WTRU, the WTRU will perform a random draw to decide when to establish the RRC connection. The random draw will stagger the RRC connection procedures in a cell to avoid overload. This information can be passed to the E-UTRAN as well so that the E-UTRAN knows when to expect to start the MBMS.

The present invention provides a method to improve uplink access and resource allocation for a counting procedure in accordance with yet another embodiment of the present invention. The counting is performed in two steps. The first step is to count WTRUs in an LTE_Active state. If there are not enough WTRUs in the LTE_Active mode, WTRUs in an LTE_Idle mode are counted. The advantage of this scheme is that WTRUs in an LTE_idle mode do not need to send an indication about their interest in a certain MBMS service when there are WTRUs in a connected mode response. It will save uplink resources (and/or downlink resources) that will be needed to support counting for WTRUs in an LTE_idle state.

The method to achieve this is described as follows:
1) MBMS service notification packet indicates that only LTE_active WTRUs need to respond for counting.
2) Optional: Change the counting parameters, (such as probability of response), so that probability of WTRUs responding back increases.
3) If there are not enough WTRUs in an LTE_Active response back for the service, the MBMS service notification package should indicate that WTRUs in an LTE_Idle state need to respond for counting.

In the LTE system, two logical channels are proposed for MBMS in yet another embodiment of the present invention. An MCCH is used for control information and an MBMS traffic channel (MTCH) is used for traffic. In LTE, the MCCH will be the only logical channel to handle MBMS control information. The previous notification transported on an MBMS indicator channel (MICH) and scheduling information on an MBMS scheduling channel (MSCH) can be sent over the MCCH.

Figure 5:
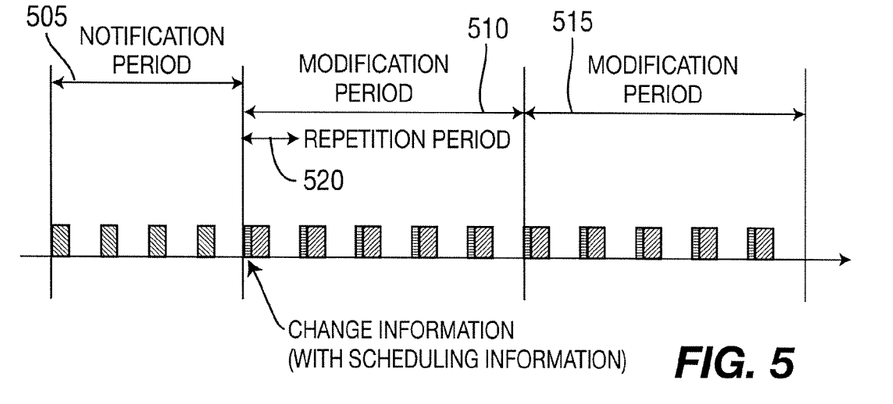
FIG. 5 illustrates MBMS control channel (MCCH) information scheduling in accordance with the present invention.

FIG. 5 illustrates the MCCH information scheduling in accordance with the present invention. It is based on the current scheduling in Release 6 with some updates. In accordance with the present invention, the eNodeB sends MBMS notification information over the MCCH to the WTRUs during a notification period 505, such that the eNodeB can notify the WTRUs that MBMS data will be provided in the upcoming downlink frames. The eNodeB may send the MBMS notification information to the WTRUs a predetermined number of times. After the notification period 505, the MBMS control information may be sent over an MCCH. The scheduling information previously sent over the MSCH can be updated during the notification period 505 by sending "change information". Following the notification period 505, a first modification period 510 starts. The MCCH information transmitted in the first modification period 510 contains more detailed information about the MBMS, including MBMS service type, the indices of subframes (or TTIs) where a particular MBMS service will be transmitted, radio bearer (RB) configuration of MBMS and the like. Another modification period 515 may occur after the first modification period 510. During repetition period 520, the non-MBMS access information is periodically transmitted. Each repetition period is shorter than the modification period.

Figure 6:
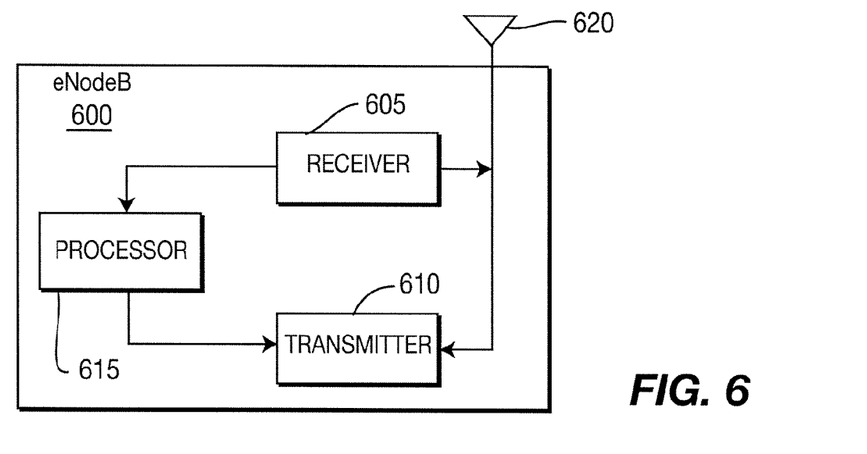
FIG. 6 shows an exemplary configuration of an eNodeB that operate in accordance with the present invention.

FIG. 6 shows an exemplary configuration of an eNodeB 600 that operates in accordance with the present invention. The eNodeB 600 comprises a receiver 605, a transmitter 610, a processor 615 and an antenna 620. The receiver 605 is configured to receive a notification that an MBMS session has started via the antenna 620. The transmitter 610 is configured to transmit a time stamp and resource availability information via the antenna 620 in response to the receiver 605 receiving the notification, as determined by the processor 615. The estimated time stamp indicates the time that the eNodeB 600 can start an MBMS transmission. The receiver 605 is further configured to receive via the antenna 620 a coordinated scheduling time stamp that indicates a coordinated time when MBMS data should be transmitted by the eNodeB 600 in the same SFN to at least one WTRU. The receiver 605 is also configured to receive MBMS data, and the transmitter 610 is further configured to transmit the MBMS data to the at least one WTRU in accordance with the coordinated scheduling time stamp. The transmitter 610 is also configured to transmit registration information via the antenna 620, and the receiver 605 is further configured to receive via the antenna 620 the details of a particular MBMS scheduling scheme.

Figure 7:
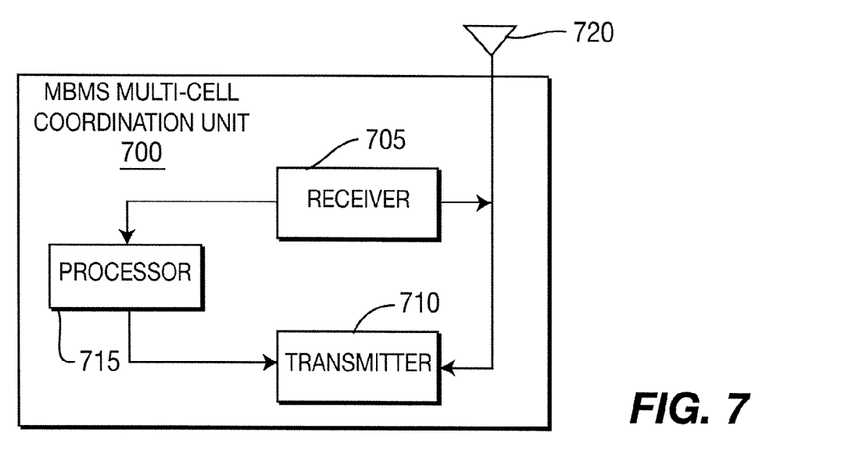
FIG. 7 shows an exemplary configuration of an MBMS multi-cell coordination unit that operates in accordance with the present invention.

FIG. 7 shows an exemplary configuration of an MBMS multi-cell coordination unit 700 that operates in accordance with the present invention. The MBMS multi-cell coordination unit 700 comprises a receiver 705, a transmitter 710, a processor 715 and an antenna 720. The receiver 705 is configured to receive via the antenna 720 a time stamp and resource availability information that indicates the time that an eNodeB can start an MBMS transmission. Under the control of the processor 715, the transmitter 710 is configured to transmit, via the antenna 720, a coordinated scheduling time stamp that indicates a coordinated time when MBMS data should be transmitted by the eNodeB in the same SFN to at least one WTRU. The receiver 705 is further configured to receive registration information transmitted by at least one eNodeB via the antenna 720, and the transmitter 710 is further configured to transmit, via the antenna 720 to a registered eNodeB, the details of a particular MBMS scheduling scheme. The receiver 705 is further configured to receive the scheduling scheme from an OAM system.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. An access gateway for controlling a plurality of evolved Node-Bs (eNodeBs) in a single frequency network (SFN), the access gateway comprising:
   a control plane interface;
   a user plane interface; and
   a multimedia broadcast multicast services (MBMS) multi-cell coordination unit including:
      a MBMS coordination control part coupled to the control plane interface and configured to coordinate control signaling to the eNodeBs of the SFN via the control plane interface, and
      a MBMS coordination data part coupled to the user plane interface and configured to coordinate data signaling to the eNodeBs of the SFN via the user plane interface,
   wherein the MBMS multi-cell coordination unit is configured to:
      receive information for determining a start time of the eNodeBs in the SFN for multicasting data from the eNodeBs, and
      send a scheduling scheme to provide a common configuration and a timestamp, corresponding to the determined start time, for start time synchronization of the multicasting of the data from the eNodeBs of the SFN.

2. The access gateway of claim 1, wherein the MBMS coordination control part has a plurality of instances.

3. The access gateway of claim 2, wherein the MBMS coordination data part has a plurality of instances.

4. The access gateway of claim 1, wherein the MBMS multi-cell coordination unit is configured to send the time stamp to indicate a coordinated time when MBMS data is to be transmitted by the eNodeBs to wireless transmit/receive units of the SFN.

5. The access gateway of claim 1, wherein the MBMS multi-cell coordination unit is configured to receive configuration information from an operations, administration and maintenance (OAM) system and to send the scheduling scheme to the eNodeBs based on the received configuration information.

6. The access gateway of claim 1, wherein the MBMS multi-cell coordination unit is configured to send the scheduling scheme to the eNodeBs in advance of multicasting of the data from the eNodeBs to commonly configure each of the eNodeBs of the SFN for multicasting of the data from the eNodeBs of the SFN.

7. A method implemented by an access gateway for controlling a plurality of evolved Node-Bs (eNodeBs) in a single frequency network (SFN), the method comprising:
coupling to control and user plane interfaces;
configuring MBMS coordination parts to coordinate signaling to the eNodeBs of the SFN via the control and user plane interfaces;
receiving information for determining a start time of the eNodeBs of the SFN for multicasting data from the eNodeBs, and
sending a scheduling scheme to provide a common configuration and a timestamp, corresponding to the determined start time, for start time synchronization of the multicasting of the data from the eNodeBs of the SFN.

8. The method of claim 7, wherein the configuring of the MBMS coordination parts includes configuring a plurality of instances of any of: (1) a MBMS coordination data part; or (2) a MBMS coordination control part.

9. The method of claim 7, wherein the sending of the timestamp includes sending one time stamp to indicate a coordinated time when MBMS data is to be transmitted by the eNodeBs to wireless transmit/receive units of the SFN.

10. The method of claim 7, further comprising receiving configuration information from an operations, administration and maintenance (OAM) system,
wherein the sending of the scheduling scheme to the eNodeBs is based on the received configuration information.

11. The method of claim 7, wherein the sending of the scheduling scheme to provide the common configuration and the timestamp includes sending the scheduling scheme to the eNodeBs in advance of multicasting of the data from the eNodeBs to commonly configure each of the eNodeBs of the SFN for multicasting of the data from the eNodeBs of the SFN.

12. The method of claim 7, wherein the scheduling scheme includes scheduling information, as any of: a MBMS service type, a data rate, a start time or an end time.

* * * * *

UNITED STATES PATENT AND TRADEMARK OFFICE
CERTIFICATE OF CORRECTION

PATENT NO. : 9,780,958 B2  
APPLICATION NO. : 14/465010  
DATED : October 3, 2017  
INVENTOR(S) : Arty Chandra, Guang Lu and Guodong Zhang Page 1 of 1

It is certified that error appears in the above-identified patent and that said Letters Patent is hereby corrected as shown below:

In the Specification

In Column 5, Line 52, change "anther" to --another--.

In Column 6, Line 14, change "MSMS" to --MBMS--.

Signed and Sealed this  
Sixth Day of November, 2018

Andrei Iancu  
*Director of the United States Patent and Trademark Office*